(12) United States Patent
Hosoda

(10) Patent No.: US 7,292,361 B2
(45) Date of Patent: Nov. 6, 2007

(54) INFORMATION PROCESSOR AND INFORMATION PROCESSING SYSTEM

(75) Inventor: Takaaki Hosoda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 804 days.

(21) Appl. No.: 10/153,533

(22) Filed: May 21, 2002

(65) Prior Publication Data

US 2002/0176106 A1    Nov. 28, 2002

(30) Foreign Application Priority Data

May 24, 2001   (JP)   ............................... 2001-155147

(51) Int. Cl.
G06F 15/16   (2006.01)
G06F 15/00   (2006.01)

(52) U.S. Cl. ...................... 358/1.15; 358/1.16; 709/205

(58) Field of Classification Search ................ 358/437, 358/426.02, 1.15, 1.13, 1.16; 715/523; 714/49; 709/205

See application file for complete search history.

(56) References Cited

U.S. PATENT DOCUMENTS

| | | | |
|---|---|---|---|
| 5,815,764 A * | 9/1998 | Tomory | 399/1 |
| 6,144,459 A * | 11/2000 | Satou | 358/1.15 |
| 6,351,316 B2 * | 2/2002 | Saito et al. | 358/1.15 |
| 6,882,448 B2 * | 4/2005 | Ishihara | 358/1.9 |

* cited by examiner

*Primary Examiner*—Douglas Q. Tran
*Assistant Examiner*—Chan S. Park
(74) *Attorney, Agent, or Firm*—Akin Gump Strauss Hauer & Feld LLP

(57) ABSTRACT

A process capability judging means (11) of the communication device (1) analyzes the subject information and it judges whether it is possible or not to process the information by this communication device so as to present to the user. A destination deciding means (12) decides a destination information processor. And a transferring means (13) transfers the subject information to the terminal (2) in the destination deciding means (12). In the terminal (2) a translating means (23) translates the received information into the form the communication device (1) is able to process and a returning means (24) returns the translated information to the communication device (1).

9 Claims, 7 Drawing Sheets

Fig.6

| NUMBER | MATTER | DATE |
|---|---|---|
| 0001 | ESTIMATE | 2001/12/25 15:30 |
| 0002 | TRAFFIC INFORMATION | 2001/12/25 15:35 |
| 0003 | GOODS DELIVERY | 2001/12/25 15:36 |
| ..... | ..... | ..... |

INFORMATION PROCESSOR AND INFORMATION PROCESSING SYSTEM

BACKGROUND OF THE INVENTION

1. Field of the Invention

The present invention relates to an information processor and an information processing system which can present output information in visible state to the user. These are, for example, a communication device which can send and receive electronic mail and facsimile.

2. Description of Related Art

Today, there are communication devices which are called internet facsimiles. These communication devices have a function of sending and receiving electronic mails in addition to a function of facsimile. These communication devices are connected to network such as the internet. They can print out the electronic mails as image data when they received the electronic mails from the network.

On the other hand they can send image data as electronic mail. That is, these communication devices can facsimile by electronic mails of the internet. For this purpose, one of these communication devices should be able to translate image data to text data, and the other should be able to translate text data to image data.

By the way, above conventional communication devices always informed the source communication device of the error message when they cannot process the received electronic mail correctly (for example, when they cannot open the appended file). However, the error message merely means that the communication was failed. Therefore, the sender who received this error message cannot find the cause of the failure. So, he cannot know how to cope with it. Moreover, there is another following problem. A sender cannot send the information again even if he received the error message, when he has deleted the original electronic mail. As a result, the user of the communication device cannot read the electronic mail when this kind of error occurred.

Consequently, the information processing to present for the user by use of a communication device is to be certain. And similarly, any information processor or information processing system is to process information to present for the user certainly.

SUMMARY OF THE INVENTION

Therefore the present invention aimed at providing an information processor and an information processing system which are capable of processing information certainly.

According to one aspect of the present invention, there is provided an information processor comprising next means. The first is a process capability judging means to analyze the subject information and judge whether it is possible or not to process the information by this information processor so as to present to the user. The second is a destination deciding means to decide a destination information processor for transferring the information in case it is not possible to process the information by this information processor. And the third is a transferring means to transfer the information to the destination information processor in the destination deciding means when the process capability judging means judged that it is not possible to process the information by this information processor.

Moreover there is provided an information processor in addition to the above information processor comprising next articles. First is a file management table to record recognition of the information content which is transferred by the transferring means. And the second is a file managing means to judge whether any received information is transferred from the destination information processor or not according to the file management table and record completion of the process when the judgement is affirmative.

Further there is provided each information processor in above each information processor: said destination deciding means decides whether sending the error message to the source information processor or transferring the information to the destination information processor when it is not possible to process the information by this information processor.

According to another aspect of the present invention, there is provided an information processing system comprising source information processor and a destination information processor. In this system, the source information processor comprising; a process capability judging means to analyze the subject information and judge whether it is possible or not to process the information by this source information processor so as to present to the user, a destination deciding means to decide a destination information processor for transferring the information in case it is not possible to process the information by this source information processor, and a transferring means to transfer the information to the destination information processor in the destination deciding means when the process capability judging means judged that it is not possible to process the information by this source information processor. And, in this system, the destination information processor comprising; a translating means to translate the received information into the specified formation and, a returning means to return the translated information to the source information processor so as to present to the user.

Moreover there is provided an information processing system in addition to the above information processing system comprising: a file management table to record recognition of the information which is transferred by the transferring means and a file managing means to judge whether any received information is transferred from the destination information processor or not according to the file management table and record completion of the process when the judgement is affirmative.

Since the information processor and information processing system according to this invention employ at least capability judging means, destination deciding means and information transferring means, they are able to process information in cooperation with the destination information processor to present for the user certainly.

BRIEF DESCRIPTION OF THE DRAWINGS

The present invention will be understood more fully by the succeeding detailed description in conjunction with the following accompanying drawings.

FIG. 6 is a diagram showing the content of the file management table;

DESCRIPTION OF THE PREFERRED EMBODIMENTS

The embodiment preferred by the inventor of the present invention will be now described with reference to the accompanying drawings hereinafter.

First Embodiment

<Configuration>

Figure 1:
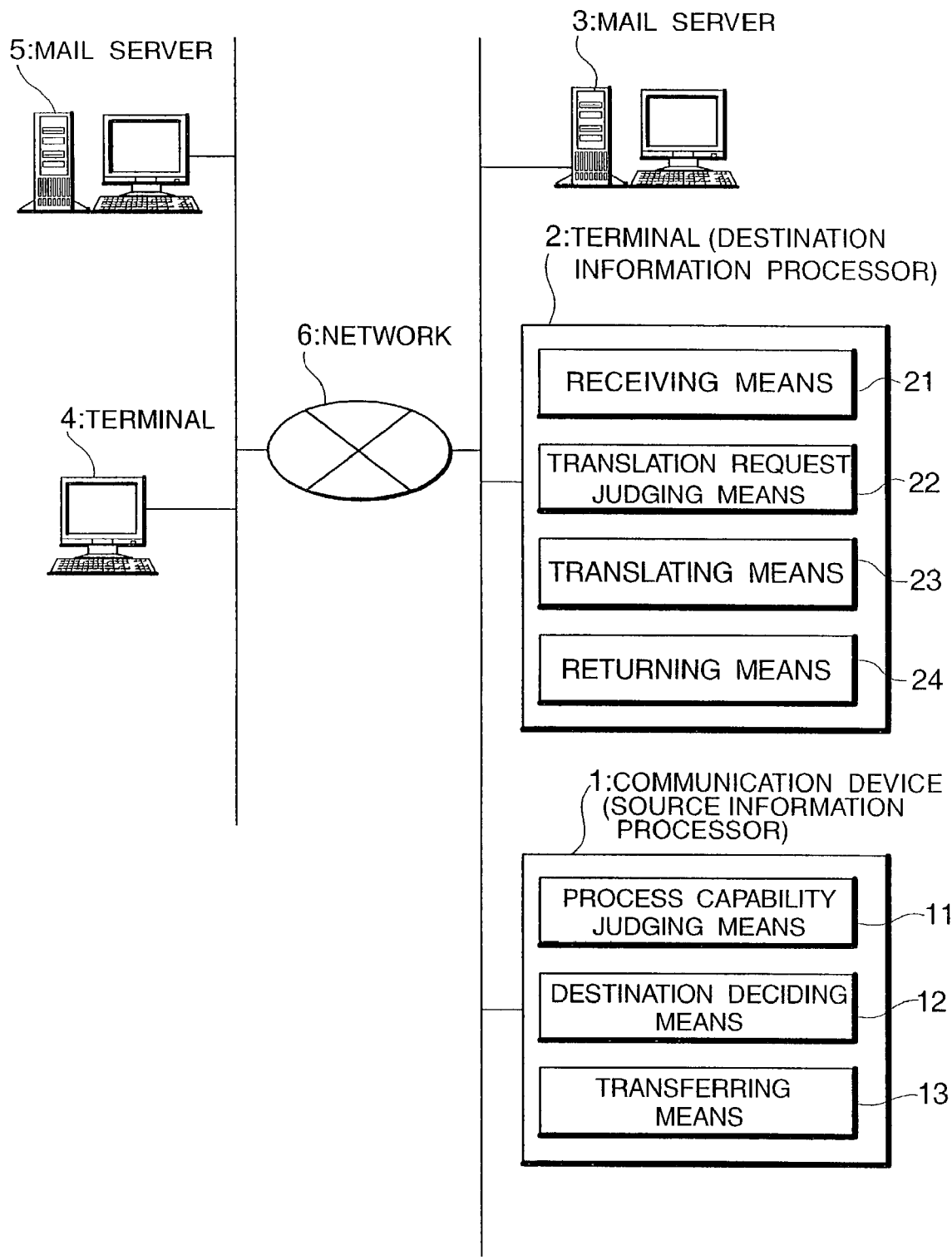
FIG. 1 is a block diagram showing the configuration of the information processing system according to the first embodiment.

The system in FIG. 1 comprises of a communication device 1, a terminal 2, a mail server 3, a terminal 4, a mail server 5 and a network 6. The communication device 1 is also called a source information processor. The terminal 2 is also called a destination information processor.

The communication device 1 is what is called an internet facsimile which has a function of electronic mail as well as a function of facsimile. And it is equipped with a process capability judging means 11, a destination deciding means 12, and a transferring means 13. These work together as a function of electronic mail processing. The process capability judging means 11, when it received the electronic mail via network 6, analyzes the header information of the electronic mail and it judges whether this communication device 1 is able to process printing of the received electronic mail or not.

The destination deciding means 12, in case the communication device 1 is not able to process printing of the received electronic mail, decides whether to inform the sender of the error or to transfer the received electronic mail to the other information processor which is able to process it. And it also decides which information processor to transfer it to when it transfers it. The transferring means 13, when the communication device 1 is not able to process it, transfers the received electronic mail to the information processor which is able to process it according to destination deciding means 12. On the other hand, the hardware configuration of the communication device 1 will be mentioned after in FIG. 2. And the illustration of the functions of facsimile and electronic mail processing for itself in communication device 1 is omitted in FIG. 1.

The terminal 2 is connected via network 6 to the communication device 1. It is a destination information processor which translates the electronic mail impossible to process in communication device 1. And it translates into the data in the form possible to process in communication device 1. And it returns the data to the communication device 1. It comprises for example a personal computer. The terminal 2 is equipped with a receiving means 21, translation request judging means 22, translating means 23, and returning means 24. These work together as a configuration for electronic mail sending and receiving and for file form translating.

The receiving means 21 has a function of electronic mails receiving via network 6. The translation request judging means 22, referring to the header information of the electronic mail, judges whether the received electronic mail is translation request from the source information processor. The translating means 23, when the translation request judging means 22 judged that the electronic mail is a request for translation, translates the file form of the received electronic mail into the file form which the communication device 1 is able to process. That is, the transferring means 33 comprises software which is an application program to cope with files of various forms. And it comprises a program for transferring these files into image files of tiff (tag image file format) form. The translating means 23 translates the file, and the returning means 24 returns the translated file to the communication device 1.

In connection with the receiving means 21, its function is made up of a network interface, a software corresponding to electronic mail receiving function, and a hardware configuration of micro-processor, memory and so on which execute the software. Moreover in connection with the translation request judging means 22 and translating means 23, their functions are made up respectively of a software and a hardware configuration of micro-processor, memory and so on which execute the software. Further, returning means 24 is made up from: a software of electronic mail receiving function, and a hardware configuration of micro-processor, memory and so on, which executes the software; and a network interface.

The mail servers 3, 5 are servers for sending and receiving mails in each network connected with network 6. The network 6 comprises of: a LAN which a terminal 4 and the mail server 5 belong to; a LAN which the communication device 1, the terminal 2 and the mail server 3 belong; and the internet which these networks are connected to. Instead, it is possible to make up the network 6 of a LAN which communication device 1, terminal 2, mail server 3, terminal 4, mail server 5 are able to communicate with each other.

Now, referring to FIG. 2, the hardware configuration of the communication device 1 will be described.

Figure 2:
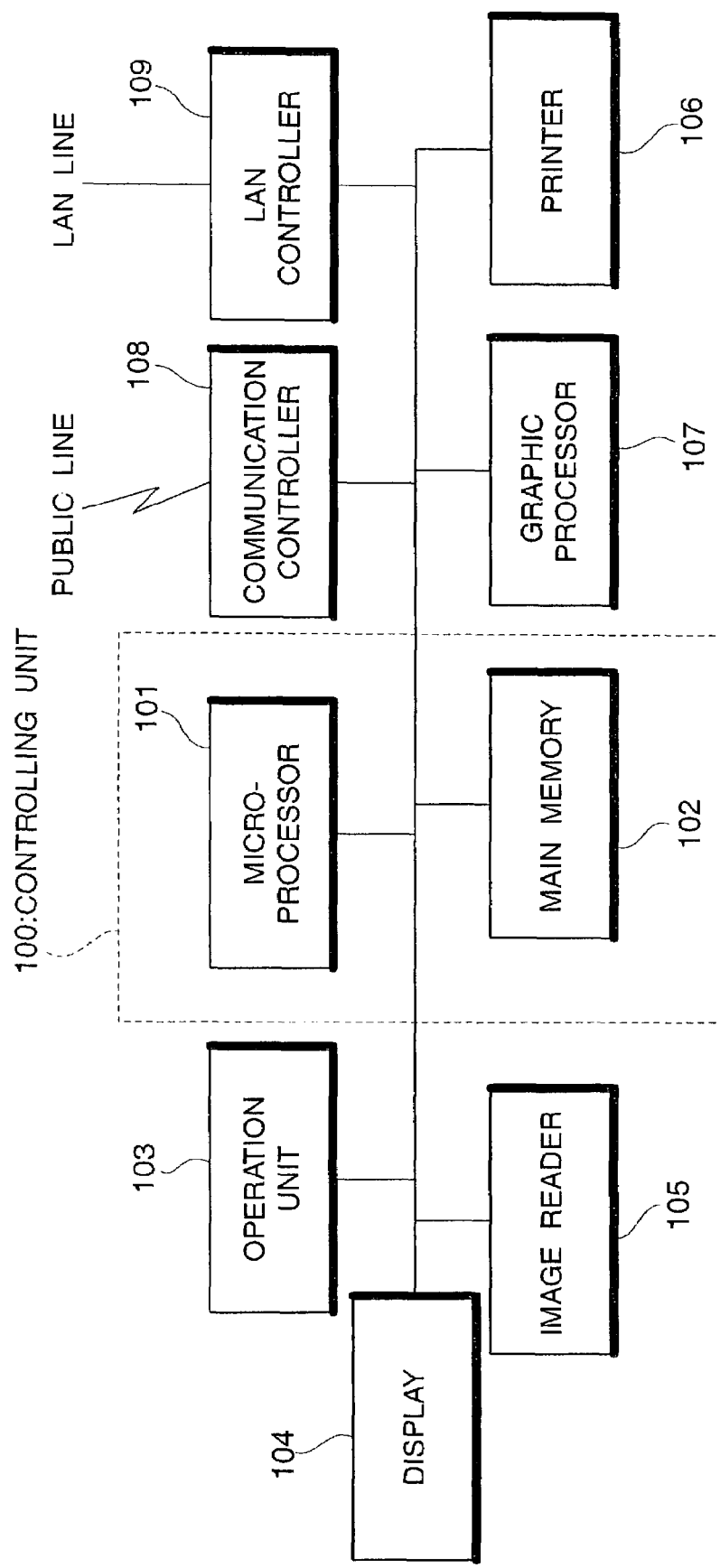
FIG. 2 is a block diagram showing the configuration of the communication device in the information processing system of FIG. 1.

As shown in FIG. 2, the communication device 1 comprises a controlling unit 100, an operation unit 103, a display 104, an image reader 105, a printer 106, a graphic processor 107, a communication controller 108, and a LAN controller 109.

The controlling unit 100 is made up of a micro-processor 101 and a main memory 102. And the micro-processor 101 is a processor to control the communication device 1 all over. The main memory 102 is a memory comprising of a semiconductor memory. In the main memory 102, there is installed a software comprising of; the process capability judging means 11, destination deciding means 12 and transferring means 13. And the main memory 102 is used for the working area of the micro-processor 101. The operation unit 103 is equipped with the keyboard for the user to operate. And, with this operation unit 103, the user proceeds to input the address of the destination to transfer the electronic mail. Because, the electronic mail is not able to be processed by the communication device 1. The display 104 comprises for example a liquid crystal display. And the display 104 presents the operation state or communication result/record.

The image reader 105 comprises scanner and so on. And a manuscript to send is read by this image reader 105. The printer 106 is a printing processor for printing the received image data. The graphic processor 107 proceeds to process modulation/demodulation of sending and receiving image. The communication controller 108 is an interface connected with the public line. In this communication controller 108, the line control is processed for sending and receiving facsimile via the public line. The LAN controller 109 is a communication interface connected with the LAN line. In this LAN controller 109, the control is processed for sending and receiving electronic mail.

In connection with this, the process capability judging means 11, destination deciding means 12 and transferring means 13 are respectively made up of the software installed in the main memory 102. This software corresponds to each means about functions and it is executed by the microprocessor 101.

<Operation>

Figure 3:
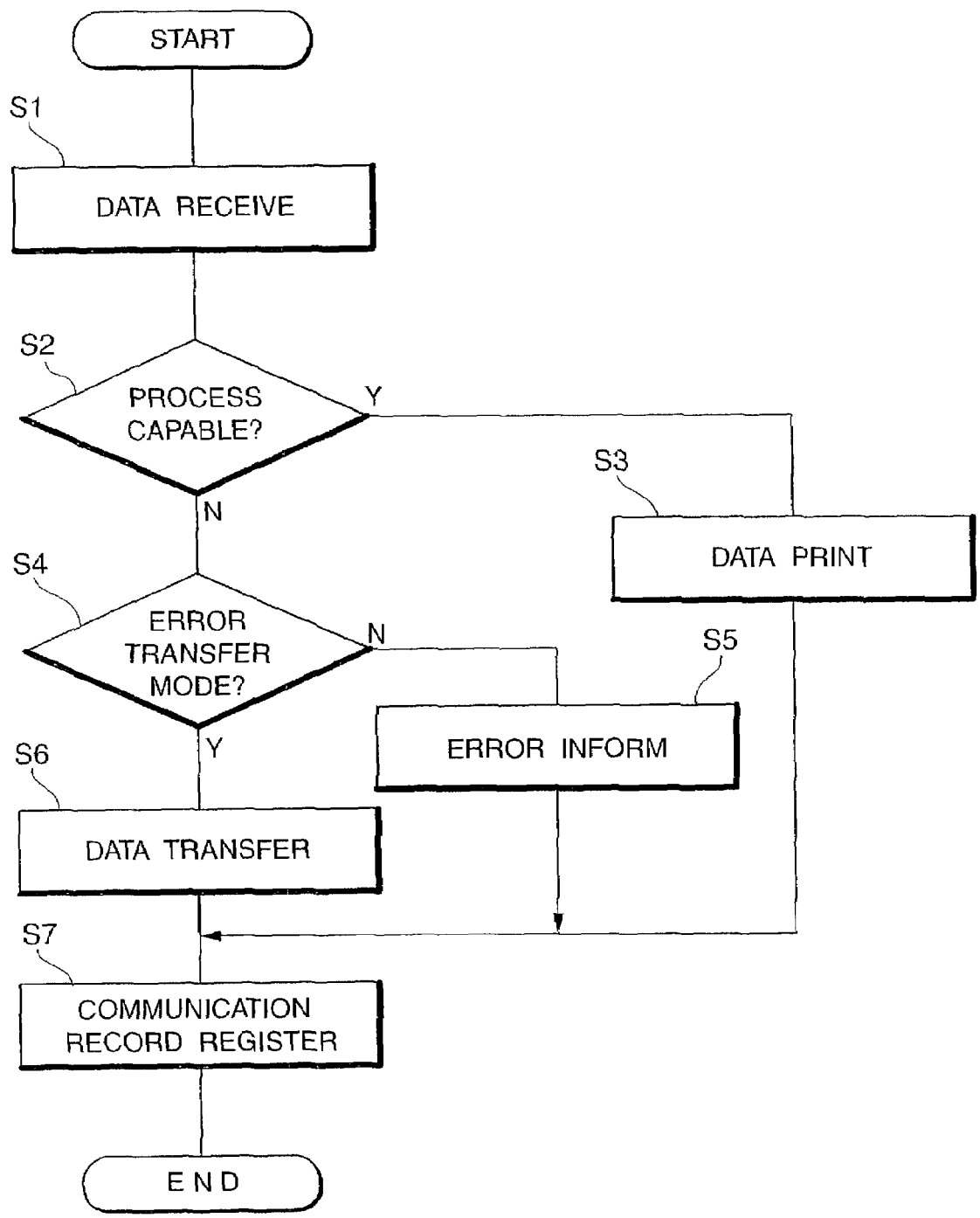
FIG. 3 is a flow chart showing the operation of the communication device according to the first embodiment of FIG. 2.

Next the operation of the communication device 1 according to the first embodiment will be described referring to the flow chart of FIG. 3.

At first, the user at the communication device 1 operates with operation unit 103 to set the error transfer mode. This error transfer mode is set in case the communication device 1 received the electronic mail which is not possible to process for itself. And this error transfer mode has two modes. One is the mode of sending the electronic mail to inform the sender of processing impossible. The other is the mode of sending the received information to the information processor which is able to process it.

And the user at the communication device 1 sets the address of information processor. This address is used when the communication device 1 transfers the received electronic mail. This address information is memorized by the destination deciding means 12. As for this embodiment, let it set the terminal 2 as a destination device.

When the communication device 1 received the electronic mail via network 6 (step S1), process capability judging means 11 refers to the header information of the received electronic mail to judge whether it is possible to process or not (step S2). That is, as for this embodiment, the file formats of the electronic mail which are possible to be processed in the communication device 1 are ordinary text file and tiff file. So, other file formats are judged to be impossible to process. As for the judging method, it is the method of looking into the Content-Type field of the header information and referring to the extension of the file. And process capability judging means 11 judges whether other files, than ordinary text file and tiff file, are contained in the mail or appended files. When process capability judging means 11 judged that the received electronic mail is possible to process, at above step S2; the controlling unit 100 processes printing the ordinary electronic mail with printer 106 (step S3). And the process ends with recording a communication record message "print normally ended" (step S7).

As for this communication record, it includes all the records of sending and receiving information which the communication device 1 processes, including all the records of both facsimile and electronic mail.

On the other hand, when there was a file which is impossible to process for itself, at step S2, the controlling unit 100 refers to the error transfer mode memorized in the destination deciding means 12 (step S4). When the error transfer mode has been set informing the sender of the error, the controlling unit 100 informs the sender of the error as same as the conventional art (step S5). And the process ends with recording a communication record message "error informed" (step S7). On the other hand, when the error transfer mode has been set "transferring to the process capable device", the transferring means 13 makes an electronic mail which appends a request message of translating the format of the electronic mail. And it sends this electronic mail to the terminal 2 which address is memorized in the destination deciding means 12 (step S6). In this connection, as for formats to append a request message for translation, there can be used several formats. One of these is for example a format which is provided with a specified field in the header information of the electronic mail to direct transferring with the message in this field. The other of these formats is a format which appends the transferring direction in Subject field. And the controlling unit 100 ends with recording a communication record message "transferred" (step S7).

Figure 4:
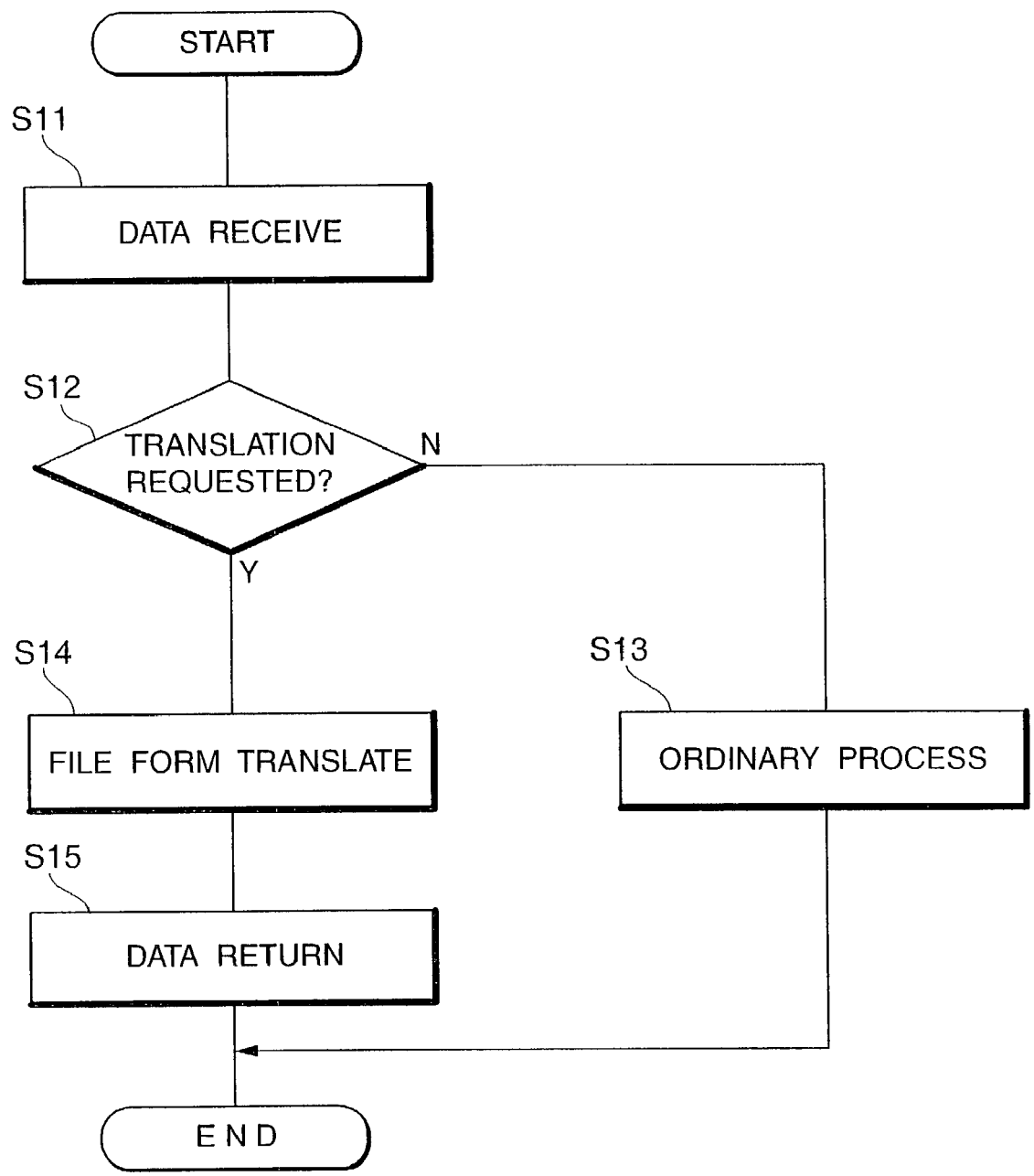
FIG. 4 is a flow chart showing the operation of the destination information processor in the information processing system of FIG. 1.

Next the operation of the terminal 2 that is the destination information processor will be described referring to the flow chart of FIG. 4.

When the terminal 2 received an electronic mail via network 6 (step S11), it judges whether the electronic mail is a transferring request mail or not (step S12). That is, it judges whether the electronic mail is an ordinary electronic mail sent from the terminal 4 and so on, or the transferred electronic mail for a translation request of the file format from the communication device 1. This judgement is accomplished by judging whether there is included the above mentioned message of translation requesting mail from the communication device 1, in the header information of the electronic mail.

When it was an ordinary mail, at step S12, the terminal 2 receives the ordinary mail with mailing software. And it processes presenting, for example displaying the content (step S13).

On the other hand, when it was a translation requesting mail, the translating means of the terminal 2 judges the file format referring to the header information of the received electronic mail and translates the file into a image file of a tiff format (step S14). For example, when the file format of a certain document was a specified format of a specified application program, it translates the format of the document's image into a tiff format of the image file. And the returning means 24 sends the translated file as an appended file of an electronic mail to the communication device 1 (step S15). After these operation process, the communication device 1 is able to receive the file with its format translated into the format able to process by it. So, it becomes to be able to process printing for itself.

In this connection, returning means 24 of the terminal 2 may be made up for informing the communication device 1 of the error. Because the terminal 2 might not translate the file format of the translation requested electronic mail. This occurs when the communication device 1 does not have the corresponding application program installed.

Although the electronic mail sending and receiving of the communication device 1 or terminal 2, 4 are processed actually via mail server 3 or mail server 5, these operations are omitted as they do not concern to the point of this invention.

<Effects>

According to the first embodiment, when the communication device 1 received the electronic mail which is not able to process, it transfers the electronic mail to the terminal 2. And the terminal 2 translates the format into the process possible format, so as to return it to the communication device 1. Therefore, the communication device 1 finally becomes able to process any electronic mail whichever format it has. Moreover, the user is able to select error informing or process ability reinforcing, in obedience to the kind of the information. Because the destination deciding means 12 is also able to set the error transfer mode according to the first embodiment.

Second Embodiments

The second embodiment is equipped with a configuration for the function of the transferred file management in addition to the configuration of the first embodiment.

<Configuration>

The configuration of the information processing system according to the second embodiment will now be described referring to FIG. 5.

Figure 5:
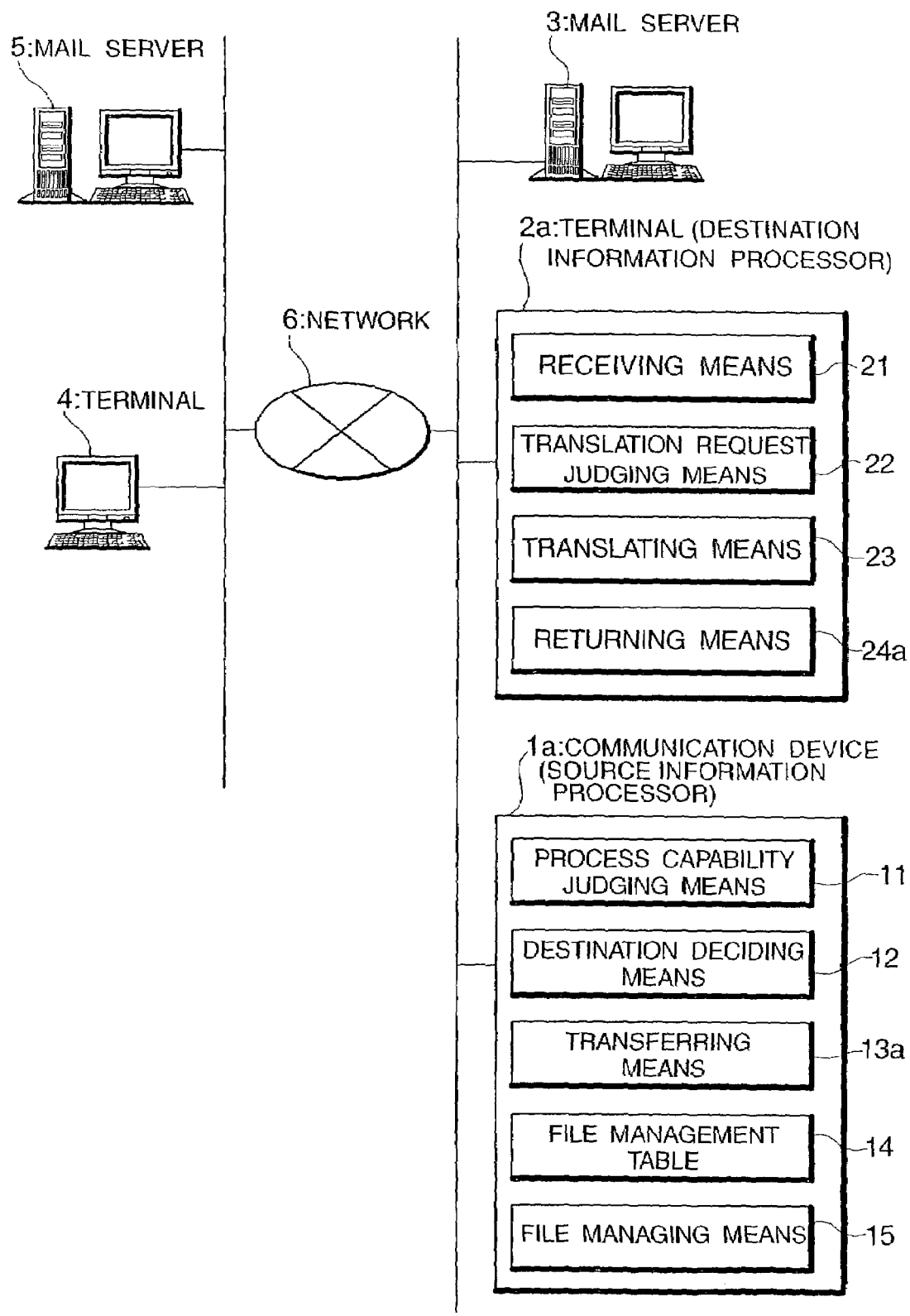
FIG. 5 is a block diagram showing the configuration of the information processing system according to the second embodiment.

The system in FIG. 5 comprises of a communication device (source information processor) 1a, a terminal (destination information processor) 2a, a mail server 3, a terminal 4, a mail server 5 and a network 6. In this configuration, the configuration of a mail server 3, a terminal 4, a mail server 5 and a network 6 is same as that of the first embodiment. So, the same description is omitted in FIG. 5, giving the same reference number to the corresponding part in FIG. 1.

The communication device 1a comprises a process capability judging means 11, a destination deciding means 12, a transferring means 13a, a file management table 14, a file managing means 15. As the process capability judging means 11 and the destination deciding means 12 have same configurations as the first embodiment, the same descriptions are omitted here. The file management table 14 is a table for making relationships between the electronic mails and the transferred electronic mails, which is compiled as follows.

Now, compiling of the file management table 14 will be described referring to FIG. 6.

The file management table 14, as shown in FIG. 6, is compiled with the articles of number, name of matter, and date. Among these articles, the number is given to recognize each matter. This number is given to each transfer in order. And the date indicates a date and time of transfer.

Back to FIG. 5, the file managing means 15 records the name of matter and date in file management table 14 when the transferring means 13 transferred any electronic mail to the terminal 2. On the other hand, when the communication device 1a received an electronic mail, the file managing means 15 judges whether this is the transferred electronic mail or not. And when this is the transferred electronic mail, the file managing means 15 makes a record of process completion in the file management table 14 corresponding to the record of transfer. To accomplish this recording, the transferring means 13a is made up to append the information of recognition number. This number is given by the file managing means 15 and it is appended in the header information of the electronic mail.

By the way, the hardware configuration of the communication device 1a according to the second embodiment is same as that of the first embodiment shown in FIG. 2. So, this configuration will be described referring to FIG. 2 hereafter. The file management table 14 is compiled in main memory 102. And the file managing means 15 is made up of the software installed in the main memory 102. This software corresponds to the file managing function. And this software is executed by the micro-processor 101.

On the other hand, the returning means 24 of the terminal 2a has a function to append the information of reply mail. This reply is for the transfer requested electronic mail. Then the returning means 24 returns the translated electronic mail to the communication device 1a of the request sender. As for this information append function, there are several means to be used. One is a means to provide a specified field indicating returned file in the header information of the electronic mail. And there is included in this field the information of recognition number appended from the transferred electronic mail. Other is a means to append the information of recognition number in Subject field. The other configuration of the terminal 2 that is that of receiving means 21, translation request judging means 22, and translating means 23 is same as the first embodiment.

<Operation>

Figure 7:
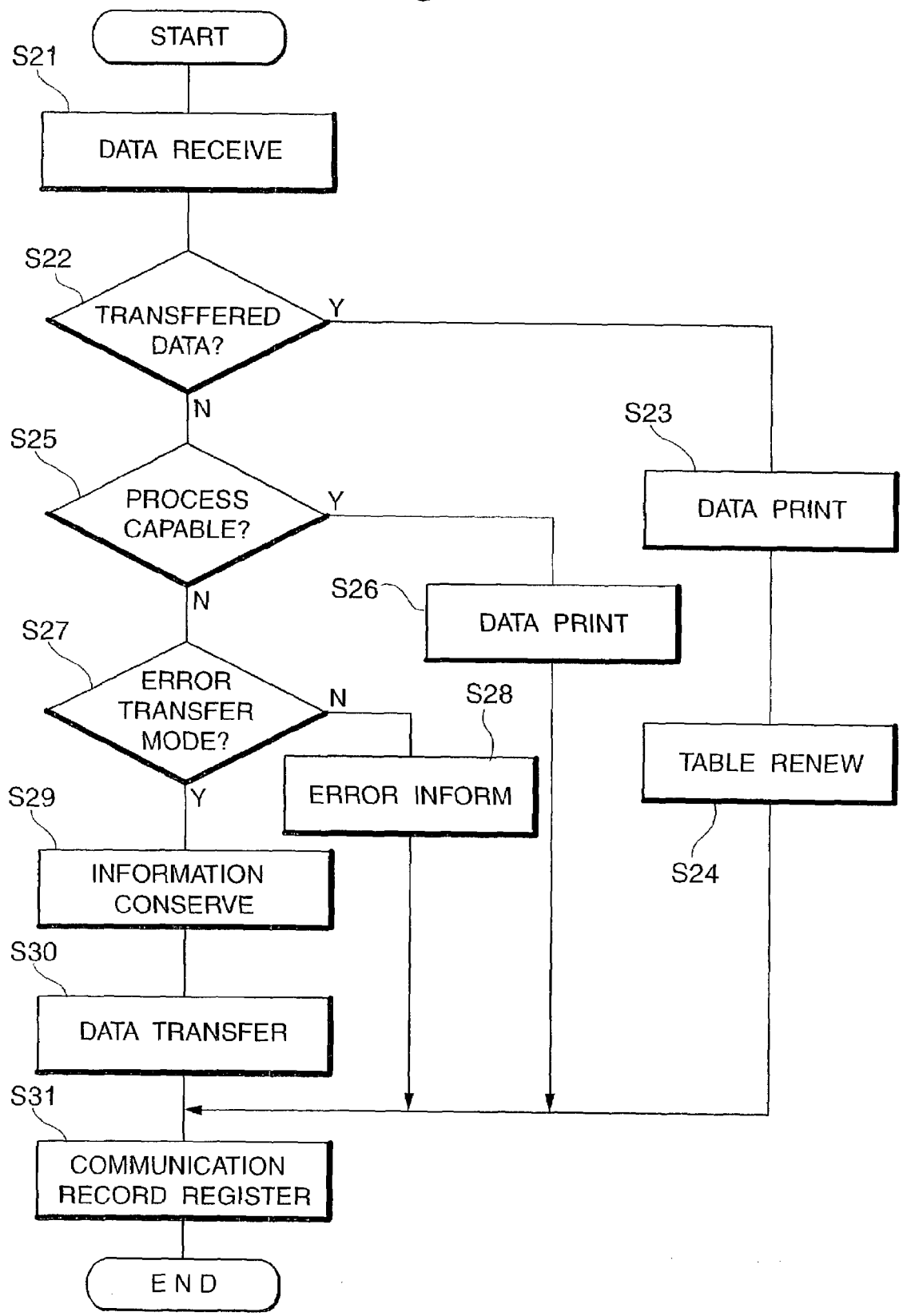
FIG. 7 is a flow chart showing the operation of the communication device according to the second embodiment.

Now, the operation of the communication device 1a according to the second embodiment will be described referring to the flow chart of FIG. 7.

At first, the user sets the error transfer mode in the communication device 1a with the operation unit 103 as well as the first embodiment. That is, when it received the electronic mail which is not possible to process, it is decided whether to send an electronic mail of impossible process to the sender or to transfer the received mail to the device which is able to process. And when it transfer, which device to transfer to is decided. This information is kept by the destination deciding means 12. And, as for this embodiment, the terminal 2 is set as a destination device.

When the communication device 1a received an electronic mail via network 6 (step S21), the file managing means 15 judges whether it is the reply mail of the transferred electronic mail from it to the terminal 2 (step S22).

As for this judging method, it judges whether the information of recognition number is included in the header information of the electronic mail. This information is appended by the returning means 24a of the terminal 2a.

At step S22, when it is the reply file of the transferred file, the controlling unit 100 processes printing the received data by the printer 106 (step S23). And the file managing means 15 renews the file management table 14. And it makes a record of process completion about this matter (step S24).

In this connection, as for this renewing process of the file management table 14, there are some methods. One is a method to append the information of being returned for the corresponding matter. Other is a method to delete the corresponding data as it is returned for this matter without fail. After this, the controlling unit 100 makes a record of "normally printed" in the communication record of the file management table 14 (step S31). And electronic mail receiving process ends.

On the other hand, at the above step S22, when the received data was not the transferred data, the same operation as the first embodiment is processed. That is, process capability judging means 11 judges whether it is possible to process or not referring to the header information of the received electronic mail (step S25). Needless to say the judging method is same as the first embodiment. Moreover, at step S25, when it is possible to process, the controlling unit 100 processes the ordinary electronic mail printing by printer 106 (step S26). And the process ends with recording "normally printed" in the communication record (step S31).

On the other hand, at step S25, when there is included a file which is impossible to process, the controlling unit 100 refers to the error transfer mode kept by the destination deciding means 12 (step S27). When the error transfer mode was indicating to "inform the sender of the error", the controlling unit 100 informs the sender of the error (step S28). And the process ends with recording "error informed" in the communication record (step S31).

Moreover, when the error transfer mode is indicating to "transfer to the device which is able to process", the file managing means 15 records the name of the matter and the date of transfer (step S29). And the transferring means 13 makes an electronic mail appended the information of that the mail is a transfer request mail to the terminal 2 registered in the destination deciding means 12. And it sends this (step S30). And the process ends with recording "transferred" in the communication record (step S31). Needless to say, the format of the file to transfer is same as the first embodiment.

Moreover, the operation of the terminal 2 which receives the transferred file is same as the first embodiment except the operation of the returning means 24*a*. That is, the returning means 24*a*, when it returns the electronic mail which is translated by the translating means 23 to the communication device 1*a* of the request source, appends the information of recognition number. This information is indicating that the mail is a reply mail for the transfer request electronic mail. This number is set in the header information. And the returning means 24*a* returns this mail to the communication device 1*a*.

<Effects>

As described above, according to the second embodiment, in addition to the effects of the first embodiment, a series of process about the transferred file are managed certainly. As a result, a more convenient communication device is provided.

Other Embodiments

Although the present invention has been described in terms of the preferred embodiments, it goes without saying that the invention is not to be limited to these embodiments. And it can be embodied in various embodiments within the region of the invention defined in the claims appended after this description.

First of all, the information in the claims has been described in terms of the electronic mail of the internet, but it is not to be limited to this, and it can be embodied in various information which is sent by electronic method. And the information is not limited to what is received via network 6, and the present invention can be embodied in information in any form, for example, the information which is read from a medium such as a floppy disk or CD-ROM. Moreover, in above each embodiment, the source information processor in the claims has been described in terms of the communication device 1, 1*a* equipped with facsimile. But it is needless to limit processor to what is equipped with facsimile or printer. And it can be for example an information processor only equipped with display unit which can process information to present for the user in visible state by a display unit. In other words, the present invention can be embodied in all kind of information processing system. And, in such system the information is transferred to a specified information processor when it is not possible to be processed by a source information processor.

By the way, in above embodiments, the information processor has been described to be able to process ordinary text file and tiff file. But it is needless to limit the kind of file formats which are possible to be processed. For example, maybe ordinary information processor in U.S. are not able to process Japanese text file, and only able to process ASCII text file. So, this kind of processors should transfer the received Japanese text file to a processor which can process this file. Otherwise, they cannot present Japanese letters to the user. That is, a processor which can process only ASCII text file, can be the source information processor. On the other hand, a processor which can process only ordinary text file, tiff file, and some other files, can be the source information processor. For there are various formats such as BMP, GIF, JPEG, or PNG.

Moreover, in above embodiments, the destination information processor sends error message to the file sender when it failed to process the received file. But it is needless to limit the transfer to one time. That is, the destination information processor can be another source information processor so as to transfer the information which is not possible to process by itself, to another destination information processor.

In addition, though the means such as the process capability judging means 11 or the destination deciding means 12 have been described to be made up of software, these means can be made up of specified hardware.

Moreover, though network 6 has been described to be LAN or the internet, this network 6 can be other network whichever transmission media or protocol be used.

In the communication device 1*a* according to the second embodiment, the recognizing information of indicating the transferred file to the terminal 2, has been described to be included in the specific field of the header information of electronic mail or in Subject field of electronic mail. But it can be included in other field or in text as well. Moreover, when the destination information processor that is the terminal 2 returns the translated file, the recognizing information is also not limited to what is described in the embodiment. But it can be any appended information format which is able to recognize the returning data. Further, the recognizing information of transferring data, has been embodied in the recognition number. But also other recognition method can be used. Such recognition method relates the information which is managed by the file management table 14 to the information which is returned from the terminal 2.

And it goes without saying that either the public line or LAN line can be replaced with wireless line.

What is claimed is:

1. An information processor comprising:
  a process capability judging means to analyze subject information and judge whether it is possible or not to process the information by the information processor so as to present to a user,
  a destination deciding means to decide a destination information processor for transferring the information in case it is not possible to process the information by the information processor, and
  a transferring means to transfer the information to the destination information processor decided by the destination deciding means when the process capability judging means judged that it is not possible to process the information by the information processor,
  wherein the transferring means adds recognition information into the information to be transferred and transfers the recognition information, the recognition information being generated in the information processor,
  a file management table to record recognition of the information content which is transferred by the transferring means,
  wherein the file management table registers the information to be transferred and the corresponding recognition information; and
  a file managing means to judge whether any received information is transferred from the destination information processor or not according to the file management table and record completion of the process when the judgement is affirmative,
  wherein the file managing means judges whether the received information includes the recognition information, and if it is included, the file managing means judges that the processing of the information corresponding to the recognition information has been completed.

2. An information processor according to claim 1:

wherein said destination deciding means decides whether sending the error message to a sender of the information or transferring the information to the destination information processor when it is not possible to process the information by the information processor.

3. An information processor according to claim 1:

wherein the information which the information processor can process is ordinary text file and tiff file.

4. An information processor according to claim 1:

wherein the information which the information processor can process is ASCII text file.

5. An information processing system comprising a source information processor and a destination information processor:

wherein the source information processor comprises;

a process capability judging means to analyze the subject information and judge whether it is possible or not to process the information by the source information processor so as to present to a user, a destination deciding means to decide the destination information processor for transferring the information in case it is not possible to process the information by the source information processor, and a transferring means to transfer the information to the destination information processor decided by the destination deciding means when the process capability judging means judged that it is not possible to process the information by the source information processor, wherein the transferring means adds recognition information into the information to be transferred and transfers the recognition information, the recognition information being generated in the information processor; and wherein the destination information processor comprises;

a translating means to translate the received information into a specified formation and, a returning means to return the translated information to the source information processor so as to present to the user, wherein the returning means adds the recognition information into the translated information to be returned and returns the recognition information, a file management table to record recognition of the information which is transferred by the transferring means, wherein the file management table registers the information to be transferred and the corresponding recognition information; and a file managing means to judge whether any received information is transferred from the destination information processor or not according to the file management table and record completion of the process when the judgement is affirmative, wherein the file managing means judges whether the received information includes the recognition information, and if it is included, the file managing means judges that the processing of the information corresponding to the recognition information has been completed.

6. An information processing system according to claim 5:

wherein said destination deciding means decides whether sending the error message to the source information processor or transferring the information to the destination information processor when it is not possible to process the information by the source information processor.

7. An information processing system according to claim 5:

wherein the information which the source information processor can process and the destination information processor specifies is ordinary text file and tiff file.

8. An information processing system according to claim 5:

wherein the information which the source information processor can process and the destination information processor specifies is ASCII text file.

9. An information processing system according to claim 5:

wherein said translating means translates the received information into the image and said returning means returns the image via facsimile.

* * * * *